US005412987A

United States Patent [19]
Bergstrom et al.

[11] Patent Number: 5,412,987
[45] Date of Patent: May 9, 1995

[54] FOLDED CANTILEVER BEAM ACCELEROMETER

[75] Inventors: John S. Bergstrom; Robert E. Sulouff, Jr., both of Williamsburg, Va.

[73] Assignee: Siemens Automotive L.P., Auburn Hills, Mich.

[21] Appl. No.: 950,615

[22] Filed: Sep. 24, 1992

[51] Int. Cl.6 .............................................. G01P 15/09
[52] U.S. Cl. .................................................. 73/517 R
[58] Field of Search ............. 73/517 R, 516 R, 517 B

[56] References Cited

U.S. PATENT DOCUMENTS

| 4,488,445 | 12/1984 | Aske | 73/517 R |
| 4,776,924 | 10/1988 | Delpierre | 73/517 R |
| 4,872,342 | 10/1989 | Hanson | 73/517 R |
| 4,926,689 | 5/1990 | Hanson | 73/517 R |

Primary Examiner—Hezron E. Williams
Assistant Examiner—Christine K. Oda
Attorney, Agent, or Firm—George L. Boller; Russel C. Wells

[57] ABSTRACT

A cantilever beam has a proof mass arranged at its distal end so as to cause the beam to resiliently deform into an S-shape when the accelerometer is subjected to acceleration intended to be detected. Strain gauge elements are placed at the two knees of the S-shape.

2 Claims, 1 Drawing Sheet

FOLDED CANTILEVER BEAM ACCELEROMETER

FIELD OF THE INVENTION

This invention relates generally to accelerometers, and more particularly to a cantilever beam type accelerometer.

BACKGROUND AND SUMMARY OF THE INVENTION

One of the uses of an accelerometer is as a crash sensor for deploying a supplemental inflatable restraint device in an automotive vehicle in the event of a crash. While electromechanical type crash sensors have the most extensive commercial use at this time, it is contemplated that electronic accelerometers will enjoy increasing usage in the future as crash sensors.

One form of electronic accelerometer is a cantilever beam that has one end supported on a mount and a proof mass at the other. Such a beam can be micromachined from silicon, and one or more strain gauges disposed on its surface at a desired sensing situs. These one or more strain gauges are connected in an electric circuit to provide a signal indicative of acceleration-induced strain in the beam.

While a cantilever beam type accelerometer has the advantage of being more sensitive than certain other types of accelerometers to on-axis accelerations intended to be detected, it may also be prone to indiscriminately pick-up certain cross-axis accelerations as well, and the latter characteristic is typically deemed to be an undesirable attribute for an automotive crash sensor.

A simple beam type accelerometer that is supported at both ends and contains the proof mass in the middle is less sensitive to cross-axis accelerations, but has the disadvantages of being less sensitive to on-axis accelerations for a given beam length.

The present invention relates to a new and unique cantilever beam type accelerometer which has both greater on-axis sensitivity and lower cross-axis sensitivity. It has the further advantage of occupying a space whose dimension that runs along the length of the beam is less than that in the case of the known cantilever beam for a given level of on-axis sensitivity, and consequently the inventive accelerometer may offer certain fabrication and packaging advantages, such as occupying less space within an enclosure and providing improved batch yield because more may be produced from a given wafer size.

These features and advantages of the invention, and others as well, may be perceived by one's reading of the following detailed description which presents a presently preferred embodiment of the invention according to the best mode contemplated at this time for carrying out the invention. The following drawings form a part of the disclosure.

DESCRIPTION OF THE PREFERRED EMBODIMENT

Figure 1:
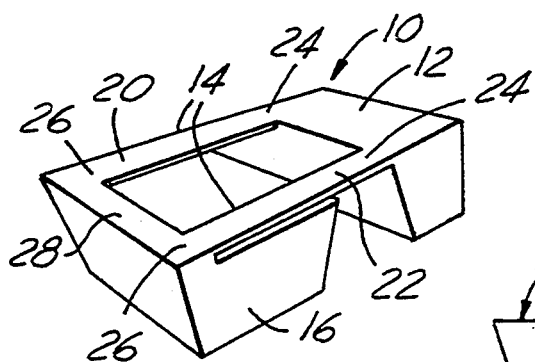
FIG. 1 is a perspective view of a representative accelerometer embodying principles of the invention shown in the absence of an acceleration force applied to it.
Figure 2:
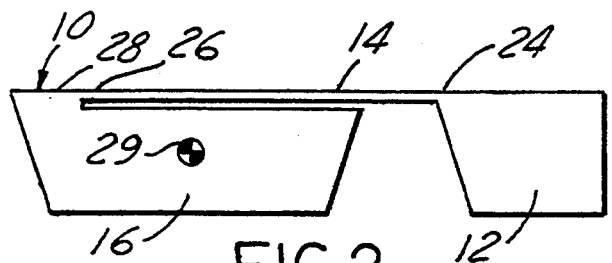
FIG. 2 is a slightly enlarged side elevational view of FIG. 1.

In FIGS. 1-6 is a first embodiment of the inventive cantilever beam accelerometer 10, sometimes referred to herein as a folded cantilever beam accelerometer. Generally, it has a mount portion 12, a beam portion 14, a proof mass portion 16, and a strain gauge portion 18, although these portions are collectively a unitary structure fabricated by micromachining of a suitable material, such as silicon.

Beam portion 14 comprises two transversely spaced apart limbs 20 and 22. Each limb has a proximal end 24 via which it is supported on mount 12 in cantilever fashion and a distal end 26. The two limbs are joined at their distal ends by a transverse segment 28, which may be deemed part of the proof mass. Viewed another way, the distal ends of the two limbs may be seen to join with the proof mass in the same manner as their proximate ends join with mount 12. The proof mass extends from transverse segment 28 back toward mount 12, in underlying relation to limbs 20 and 22 as viewed in FIG. 2. Hence, the name "folded" cantilever beam accelerometer. The proof mass has a bulk that places its center of gravity 29 at a location that is significantly closer to the proximal ends 24 of the two limbs than are the distal ends 26 of the two limbs from the proximal ends 24. The center of gravity is transversely centered between limbs 20 and 22.

While the illustrated embodiment of accelerometer is intended to measure on-axis (Z-axis) acceleration (positive and/or negative), it may be incidentally subject to certain cross-axis (Y-axis) accelerations, but should be virtually insensitive to (X-axis) disturbances.

The two limbs 20 and 22 are essentially identical, having uniform width and thickness throughout their respective lengths. When the accelerometer is subject to no (Z-axis) acceleration, the two limbs assume substantially a flat plane as in FIGS. 1 and 2.

Figure 5:
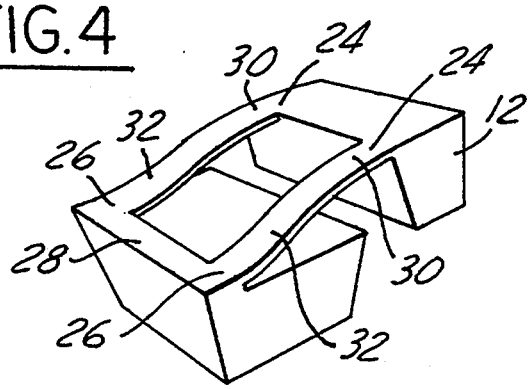
FIG. 5 is a view like that of FIG. 1 showing the application of acceleration force to the accelerometer.
Figure 6:
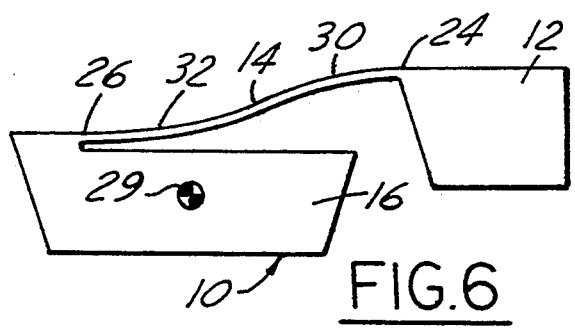
FIG. 6 is a slightly enlarged side view of FIG. 5.

When subject to (Z-axis) acceleration intended to be detected, each limb assumes a condition in which two spaced apart zones on the same surface of the limb experience opposite polarity strain. In other words, one zone experiences compression, the other, tension. As the magnitude of the acceleration force increases, the limbs resiliently deform to assume a definite S-shape, as represented by FIGS. 5 and 6. The S-shape becomes increasingly prominent as the force increases, and is seen to comprise two spaced apart knees 30 and 32 lying in the zone between its proximal end 24 and its distal end 26.

The strain gauge portion 18 comprises eight strain gauge elements 34, 35, 36, 37, 38, 39, 40, and 41 disposed on beam 14 at the situs illustrated. This situs comprises the top surfaces of the two limbs at the locations where knees 30 and 32 form when the accelerometer is accelerated. The strain gauge elements are resistor type devices disposed on the top surfaces of the limbs by conventional techniques. Strain gauge elements 34, 36, 38, and 40 are arranged with their lengths parallel to the lengths of limbs 20 and 22 while the other four, 35, 37, 39, and 41, are arranged with their lengths transverse to the limbs' lengths. Elements 34 and 35 are located at knee 30 of limb 20; elements 36 and 37, at knee 30 of limb 22; elements 38 and 39, at knee 32 of limb 20; and elements 40 and 41, at knee 32 of limb 22.

Figure 4:
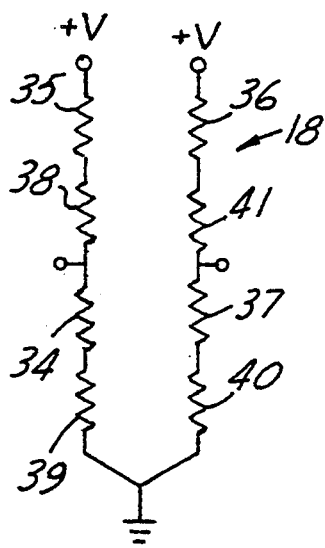
FIG. 4 is an electric schematic of one possible way to connect the accelerometer's strain gauge elements.
Figure 3:
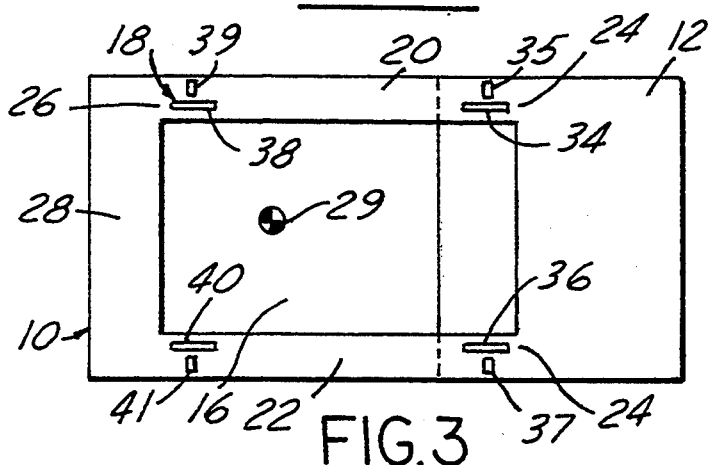
FIG. 3 is a slightly enlarged top plan view of FIG. 1.
Figure 7:
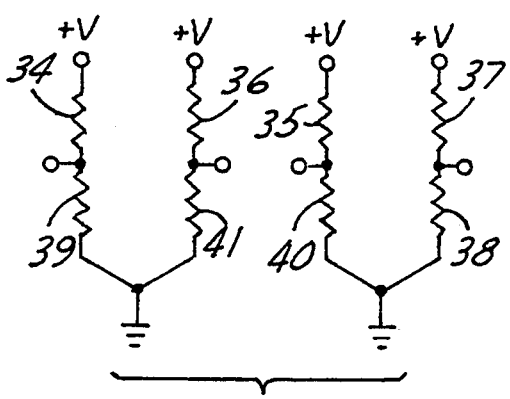
FIG. 7 is an electric schematic of another possible way to connect the accelerometer's strain gauge elements.

FIG. 4 depicts a bridge circuit configuration for connecting the eight strain gauge elements in a single bridge circuit for single axis (Z axis) sensitivity to provide an output signal that takes into account the effect of cross-axis acceleration. FIG. 7 depicts a circuit configuration connecting elements 34, 36, 39, and 41 in bridge one circuit to provide a separate cross-axis output signal and elements 35, 37, 38 and 40 in another bridge circuit to provide a separate on-axis output signal. The two output signals of FIG. 7 may then be processed as desired by external circuitry (not shown).

While beam 14 can be fabricated from a semi-conductor like silicon, other materials may be used for the beam, alumina ceramic for example. The specific response characteristics of any particular accelerometer fabricated in accordance with principles of the invention will depend on material used and on the sizes and shapes of the beam and the proof mass. For example the geometry of the proof mass may be selected in relation to the beam to achieve a particular placement of the center of gravity of the proof mass in relation to the beam. The particular placement of the center of gravity of the proof mass in relation to the beam will have an effect on the extent to which the accelerometer is sensitive to cross-axis acceleration. In accordance with known principles of mechanics, the dimensions of the beam bear on the cantilever characteristic, and naturally the beam must have sufficient strength to resiliently cantilever for the particular proof mass. It should be understood that at small accelerations, the visual appearance of the resiliently deformed beam may not readily reveal the S-shape, but its existence may be proven by the responses of the strain gauge elements at its respective knees.

The folded cantilever beam accelerometer of the invention offers improved sensitivity to on-axis acceleration forces (i.e., improved gain). It is also less sensitive to cross-axis acceleration forces.

While a presently preferred embodiment of the invention has been illustrated and described, it should be appreciated that principles are applicable to other embodiments falling within the scope of the following claims.

What is claimed is:

1. An accelerometer comprising a mount and a proof mass that are spaced apart along a longitudinal direction, said mount and said proof mass are joined by a pair of longitudinally extending, laterally spaced apart, parallel cantilever beams that are flat and straight in the absence of the application of external acceleration forces to the proof mass along a sensing axis that is transverse to the longitudinal direction, but that flex to S-shapes when such forces are applied, said proof mass extending longitudinally back toward said mount from locations where said beams join with said proof mass such that the bulk of said proof mass is spaced from said cantilever beams in the direction of said sensing axis, the center of gravity of said proof mass is disposed longitudinally between the locations where said beams join with said proof mass and where said beams join with said mount, said proof mass has a lateral extent spanning the lateral distance between said beams, and the center of gravity of said proof mass is laterally centered between said beams, including sensing means mounted on said beams for sensing flexing of said beams in response to acceleration forces along said axis.

2. An accelerometer as set forth in claim 1 in which said sensing means comprises multiple strain gauges disposed at respective locations on said beams where maximum curvature into S-shapes occurs.

* * * * *